July 2, 1929.  G. O. HODGE  1,719,702

ANTIFRICTION BEARING AND METHOD OF MAKING THE SAME

Filed Sept. 16, 1924

INVENTOR.
George O. Hodge
BY
ATTORNEYS.

Patented July 2, 1929.

1,719,702

UNITED STATES PATENT OFFICE.

GEORGE O. HODGE, OF BRISTOL, CONNECTICUT, ASSIGNOR TO STANDARD STEEL AND BEARINGS, INCORPORATED, OF PLAINVILLE, CONNECTICUT, A CORPORATION OF CONNECTICUT.

ANTIFRICTION BEARING AND METHOD OF MAKING THE SAME.

Application filed September 16, 1924. Serial No. 737,983.

This invention relates to an anti-friction bearing and among the objects of the invention is the provision of a device of this nature which possesses the maximum simplicity, the parts of which can be readily assembled and which in action is highly efficient.

The device possesses other features of novelty and advantage which with the foregoing will be stated at length in the following description in which I will set forth in detail that form of embodiment which I have selected for illustration in the drawing accompanying and forming part of the present specification. This showing is to enable those skilled in the art to practice the invention. I am in no sense restricted thereto. I may depart therefrom in several respects within the scope of the invention defined by the claims following said description.

Referring to said drawing:

Fig. 1 is a central vertical section before the oil retainer is in assembled relation.

Fig. 1ª is a side elevation of the complete bearing with the oil retainer in place.

Like characters refer to like parts throughout the several views.

The device as shown embodies an outer member, as 2, an inner member, as 3, and a ball retaining member, as 4. The ball retaining member, as shown, is of cage construction and receives in it several anti-friction members which, as represented, consists of an annularly arranged series of balls or rollers, as 5.

Figure 1:
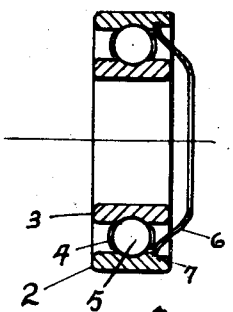
Figure 1A:
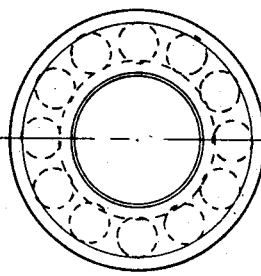
Figure 2:
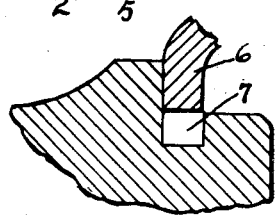
Fig. 2 is a view of the lower part of the bearing on an enlarged scale with the oil retainer being inserted in place.
Figure 3:
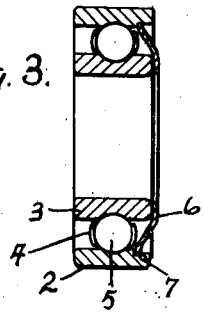
Fig. 3 is a view similar to Fig. 1 except that the oil retainer is in assembled relation.
Figure 4:
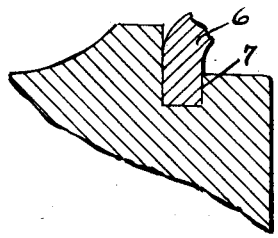
Fig. 4 is a view somewhat similar to Fig. 2 with the oil retainer positioned.
Figure 6:
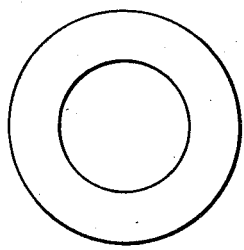
Fig. 6 is a front face view of the oil retainer as a blank, showing a plain flat annular structure, being on the same scale as Fig. 1.

An oil retainer, as 6, initially consists of a disc of sheet material which is caused to be seated in final engagement by a ram, as will be hereinafter set forth. The retainer 6 is initially inserted in the outer member or ring 2, as represented in Figs. 1 and 2, with its peripheral portion opposite the annular groove or channel 7, as represented in Figs. 1 and 2, at which point by the aid of a ram or in some other manner the oil retaining member 6 in circumferentially expanded so as to project its peripheral portion into the annular groove 7, as shown in Figs. 3 and 4, thus making the circumferential portion of said member 6 oil tight and at the same time pressing out all creases. Owing to the resiliency of the member 6, it springs back to the shape shown for clearance, thus insuring the cone or member 3 to rotate without contact with such member.

Figure 5:
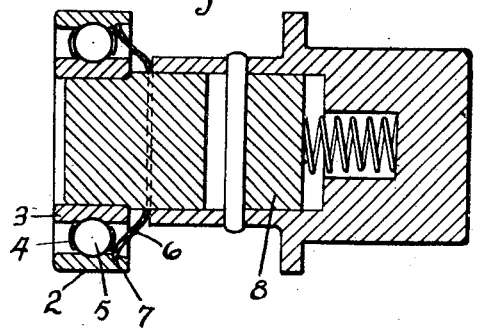
Fig. 5 is a transverse section of the bearing and showing the ram in section and in the act of assembling the parts.

It should also be noted that the positioning of the ram 8 (Fig. 5) in the oil retaining member 6 makes such member 6 concentric with the bearing member 3 and its central hole.

As an incident to the invention, I will cover in the claims a method of assembling the elements.

As to the detail of pressing out of the creases during the assembling of the retainer, the inner ring operates as as anvil in sustaining the thrust of the ram. The opposed portion of the retainer is brought into face to face contact with said inner ring.

Thus the said portion of the retainer during assembling is thrust slightly beyond the final desired position, which latter involves a clearance space between the retainer and the inner ring. Such a clearance space is obtained after the removal of the ram by reason of the resiliency of the material of the retainer which effects a springing of the retainer away from the inner ring to the extent that is needed.

The retainer in the assembled position comprises the peripheral portion that is forced into the slot in the outer ring; the inner portion that borders the bore and is opposed to the inner ring; and the intermediate connecting portion or body portion which is directed at an inclination between the other two portions mentioned, and which may also be designated as the dished or conical portion.

The connection between the outer portion and the inner portion is substantially as short and direct as is practically feasible.

What I claim is:

1. The method of maintaining an oil retaining disk in ball bearings, the outer race being grooved for receiving the retainer, which comprises positioning the outer edge of the disk in the groove and then swedging the center of the disk adjacent the inner member to provide a clearance space between the inner edge of the disk and the opposed face of the bearing.

2. In a ball bearing an oil retainer, inner and outer rings and balls therebetween, said outer ring being provided with a radial slot that opens into the bore, said retainer being made of sheet metal and of washer-like form, the inner portion of said retainer, bordering the opening, overhanging the side face of said inner ring and in clearance relation thereto, and the peripheral portion of said retainer being expansively fitted into said slot to provide support for the retainer and an oil tight engagement with said outer ring.

3. In a ball bearing as described in claim 2, the part of said retainer that is intermediate said inner and peripheral portions extending substantially directly from the one portion to the other portion.

4. In assembling an oil retainer of sheet metal in a ball bearing having inner and outer rings and balls therebetween, said outer ring having a radial slot for the retainer that opens into the bore, said retainer being of annular form and having the inner portion closely adjacent and in clearance relation to the opposed side face of said inner ring, the steps comprising dishing said retainer so as to reduce the diameter thereof for permitting entry thereof within said bore, positioning said retainer in said bore, and forcibly operating upon the body portion of said retainer so as to circumferentially expand the retainer structure and force the peripheral portion thereof into said slot.

5. In assembling an oil retainer of sheet metal in a ball bearing as described in claim 4, the means so forcibly operating upon the body portion serving simultaneously to press out creases in said body portion.

6. In assembling an oil retainer of sheet metal in a ball bearing as described in claim 4, the parts being constructed and arranged so that the assembling operation is carried beyond the final clearance position of the retainer and upon release of the assembling pressure in engagement with the body portion of the retainer the resiliency of the material of the retainer is free to serve to effect a springing back of the body portion and effect such clearance relation of the retainer to the inner ring.

7. In assembling an oil retainer of sheet metal in a ball bearing having inner and outer rings and balls therebetween, said outer ring being provided with a radial slot that opens into the bore for receiving the peripheral edge portion of said retainer, providing the blank for the retainer in the form of a plain flat annular structure, and having a diameter greater than the diameter of said bore, contracting said blank diametrally by cupping, entering said cupped blank within said bore, and finally forcibly straightening said blank and simultaneously forcing said peripheral portion into said radial slot.

In testimony whereof I affix my signature.

GEORGE O. HODGE.